United States Patent Office 3,458,490
Patented July 29, 1969

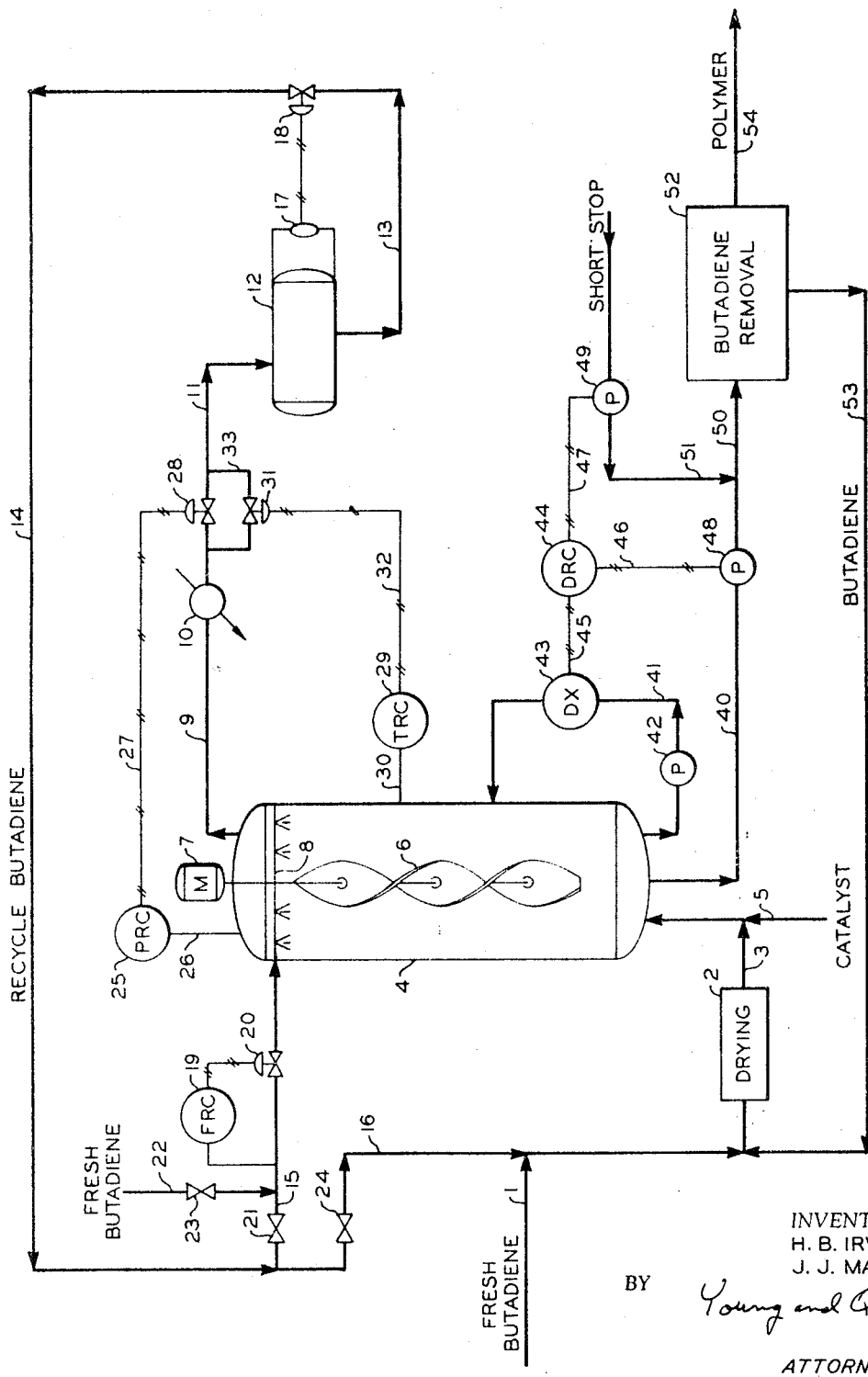

3,458,490
POLYMERIZATION
Howard B. Irvin and James J. Mathias, Bartlesville, Okla., assignors to Phillips Petroleum Company, a corporation of Delaware
Filed Dec. 31, 1964, Ser. No. 422,832
Int. Cl. C08d 1/00
U.S. Cl. 260—94.2                           8 Claims

ABSTRACT OF THE DISCLOSURE

In a method and apparatus for catalytic, solution polymerization of conjugated dienes in the absence of a diluent, the solution is spirally agitated and unreacted diene is vaporized, removed from the reaction zone, condensed, and at least a portion of the condensed monomer is recycled to the reaction zone and sprayed into the reactor to cool the solution and to wash polymer from the reactor walls.

---

This invention relates to a method and apparatus for polymerizing a monomer.

Heretofore in the production of polymers an extraneous solvent, i.e. a solvent which is chemically different from the monomer to be polymerized, for example n-hexane, has been utilized. Generally, such polymerization operations are of quite large scale and very large quantities of extraneous solvent must therefore be employed. Since the operation is large, the cost of recovering and recycling the solvent with attendant loss of extraneous solvent due to leakage, evaporation and the like has also been large and is a significant cost factor in such operations.

Also heretofore, in polymerization reactors, heat exchangers have been employed in the interior of a reactor. Such an arrangement takes up valuable space in the interior of the reactor and also presents maintenance problems.

Quite unexpectedly, it has been found that a conjugated diene monomer, preferably having from 4 to 6 carbon atoms per molecule, can be bulk polymerized, i.e. in the absence of an extraneous solvent, by spirally agitating a mixture of the boiling monomer and a catalyst in a reacting zone while at the same time removing monomer vapors from the reacting zone to thereby remove excess heat created by the polymerization reaction and condensing the removed vapors. The spiral agitation feature of this invention supplements the local agitation within the polymerization solution due to boiling of the monomer by providing overall circulation of the entire polymerization solution, which can be quite viscous due to the absence of extraneous solvent and high conversion rates, thereby intimately intermixing the local areas of boiling. The spiral agitation feature is therefore, a more efficient means for achieving more complete mixing of the entire bulk polymerization reaction mass as compared to conventional turbine, propeller, paddle and the like, stirrers.

The condensed vapors are then returned, at least in part, either alone or with fresh monomer to the top of the reacting zone and sprayed into said zone to cool same and to wash polymer from the upper surfaces of the zone down into the mixture of monomer and catalyst. The washing feature of this invention prevents buildup of polymer in the upper portions of the reactor and the operation and maintenance problems associated with such a buildup. It should be noted that according to this invention either fresh monomer or recycle monomer can each be employed alone as spray in the top of the reactor or they can be combined in any desired amounts.

After the reaction takes place a solution of polymer in monomer, i.e. polymer-monomer solution, is removed from the reactor, the unreacted monomer is removed from the polymer and returned to the polymerization system for reuse in the reactor and the polymer is recovered as a product of the process.

It can be seen that by the method and apparatus of this invention the use of extraneous solvent and the problems and costs associated therewith are eliminated as are the problems and costs associated with the use of heat exchangers internally in the polymerization reactor.

Accordingly, it is an object of this invention to provide a more economical and simplified method of polymerizing a monomer. It is another object of this invention to provide a more economical and simplified apparatus for producing polymers.

Other aspects, objects and the several advantages of the invention will be apparent to those skilled in the art from the description, the drawing and the appended claims.

The drawing illustrates diagrammatically a system embodying this invention.

In the drawing, fresh monomer passes by conduit 1 to a drying operation 2 and then by conduit 3 to reactor 4. Catalyst is added by conduit 5 to the dried monomer in line 3 prior to introduction of same into reactor 4. In reactor 4 a spiral or screw-ribbon blender type agitator 6 is rotated by motor 7 in order to continuously and spirally mix the mixture of monomer and catalyst. Agitator 6 revolves slowly, for example on the order of from about 1 to about 60 r.p.m., and can be any known type of spiral agitator. For example the spiral can be either right- or left-handed and can be a solid vane twisted spirally about a central shaft, a ribbon vane twisted spirally about but laterally spaced from a central shaft, a rectangular strip of metal twisted about its longitudinal axis to form a "twisted tape" type of agitator and the like. Preferably the screw-ribbon agitator has the screw and the ribbon pitched in opposite directions, for example if the screw is right-handed the ribbon will be in effect left-handed. Also, in reactor 4 there is mounted in an upper portion thereof a spraying means 8 of a configuration which conforms with the interior of reactor 4 so that fluid sprayed into the reactor impinges, at least in part, on the upper surfaces of the reactor to thereby wash from such surfaces any polymer which may be depositing upon and building up thereon.

Monomer vapor passes from the upper portion of reactor 4 by conduit 9 and is condensed in condensor 10 and then passed by conduit 11 to accumulator 12. The condensed vapor or liquid monomer is then removed from accumulator 12 by conduit 13 and passed by conduit 14 either into conduits 15 or 16 or both. The flow of liquid monomer from accumulator 12 is controlled by liquid level controller 17 which is operatively connected to motor valve 18 in line 13. The recycle monomer in conduit 15 passes into spray means 8 the flow to which is controlled by flow recorder 19 which is operatively connected to line 15 and to motor valve 20 in line 15. The flow of recycle monomer from line 14 into line 15 can be stopped by valve 21. Fresh dried monomer can be added to 15 through conduit 22, the flow through which is controlled by valve 23. That part of the recycle monomer, if any, which passes from 14 into line 16 then passes into line 1 to be dried and returned to reactor 4. The flow of recycle monomer in line 16 is controlled by valve 24.

Thus, it can be seen that there are several ways in which to practice this invention as regards the use of lines 15, 16 and 22 and valves 21, 24 and 23. For example, valve 21 can be closed and valves 23 and 24 open so that recycle monomer passes directly to line 1 and only fresh monomer is sprayed into reactor 4 by spraying means 8. It could also be that valve 23 is closed, valve 21 open and valve 24 at least partially open so that recycle monomer passes both to spray 8 and to line 1. Also, it could be that valves 21, 24 and 23 could all be at least partially open so that both fresh and recycle monomer pass to spray 8 while some recycle monomer also passes to line 16. Finally, it can be that valve 24 is closed so that all recycle monomer passes to spray 8 and substantially only fresh monomer passes through line 1 to reactor 4 except for that recycle monomer which is removed in monomer removal zone 52 and returned by conduit 53.

The flow of monomer vapor from reactor 4 to condenser 10 and of liquid monomer from condenser 10 to accumulator 12 is primarily controlled by pressure recorder controller 25 which is operatively connected by line 26 to reactor 4 and by conductor 27 to motor valve 28 in line 11. By this arrangement, for example, when the pressure exceeds a predetermined maximum value pressure recorder controller 25 will sense the pressure excursion and will open motor valve 28 further to allow more monomer vapor to be removed from reactor 4, thereby maintaining a desired pressure and temperature of the boiling monomer in reactor 4. The flow of material through line 9 is secondarily controlled by temperature recorder controller 29 which is operatively connected to reactor 4 by sensor 30 and by conductor 32 to normally closed motor valve 31. Motor valve 31 regulates the flow of material through by-pass line 33 so that, for example, if the temperature should exceed a predetermined maximum value temperature recorder controler 29 will sense the temperature excursion and open motor valve 31 thereby allowing additional condensed vapor from condenser 10 to bypass motor valve 28 and pass directly into accumulator 12. The total effect of the operation of temperature recorder controller 29 and motor valve 31 is to provide means for immediate response to temperature excursion and to alleviate the excursion by removing reaction heat by removing larger amounts of monomer vapor.

Polymer that is formed in reactor 4 is removed in the form of a solution of polymer in monomer by line 40. In order to determine when the polymer-monomer solution should be removed from reactor 4 closed loop conduit 41 is provided wherein the mixture of polymer and monomer is moved by pump 42 continuously or intermittently throughout the reaction period. Density transmitter 43 senses the density of the material passing through loop 41 and when the density reaches a sufficiently elevated magnitude, thereby indicating a large portion of polymer is present, signals density recorder controller 44 which is operatively connected to density transmitter 43 by conductor 45. Density recorder controller 44 initiates by conductors 46 and 47, respectively, pumps 48 and 49. Operation of pump 48 removes the polymer-monomer solution from reactor 4 through conduits 40 and 50 and operation of pump 49 injects by conduit 51 a shortstop material into line 50 to mix with the polymer-monomer solution and stop the polymerization reaction.

The polymer-monomer solution and shortstop material then passes to a conventional monomer removal operation 52 which is known in the art and in which the monomer is removed from the polymer and returned by conduit 53 to line 16 for drying and reuse in reactor 4. The polymer product of the invention is removed from zone 52 by conduit 54 for further treatment, storage, marketing and the like.

Although it is not now presently preferred, it is within the scope of this invention to, with instrumentation variations known in the art, utilize the method and apparatus of this invention on a continuous basis whereby a certain amount of monomer in catalyst is being continuously fed into the reactor at the same time a certain amount of monomer solution is removed from the reactor. At present, however, it is preferred to employ this invention in a batch operation but it is to be understood that this is not an exclusive mode of practicing this invention.

Generally, any conjugated diene monomer that can serve as a solvent for the polymer produced can be utilized as a feed material for this invention. However, preferred conjugated dienes are those having from 4 to 6 carbon atoms per molecule which includes such dienes as butadiene, isoprene, piperylene, 2,3-dimethyl-1,3-butadiene, 2-methyl-1,3-pentadiene and the like. Other dienes are listed in copending application, Ser. No. 45,042, filed July 25, 1960, of common assignee, now Patent 3,099,640, issued July 30, 1963.

The polymers of this invention can be formed by utilizing one of several known catalysts which will be obvious to those skilled in the art. Examples of such catalysts are alkali metals such as sodium and lithium, organic peroxides such as benzoyl peroxide, hydroperoxides such as dimethylphenylhydroperoxymethane, isobutylaluminum plus titanium chloride, triethylaluminum plus titanium iodide and the like. A preferred catalyst at least for polymerizing butadiene is that which contains lithium. These catalysts have the formula $RLi_x$, wherein R is a hydrocarbon radical selected from the group consisting of aliphatic, cycloaliphatic and aromatic radicals and $x$ is an integer from 1 to 4, inclusive. The R in the formula has a valence equal to the integer and preferably contains from 1 to 20, inclusive, carbon atoms, although higher molecular weight compounds can be utilized. In preparing the polybutadiene, it is often preferred to use an alkyllithium compound, such as n-butyllithium, as the catalyst. Examples of other suitable organolithium compounds include methyllithium, isopropyllithium, tert-octyllithium, n-decyllithium, phenyllithium, naphthyllithium, 4-butylphenyllithium, p-tolyllithium, 4-phenylbutyllithium, cyclohexyllithium, 4-butylcyclohexyllithium, 4 - cyclohexylbutyllithium, dilithiomethane, 1,4 - dilithiobutane, 1,10-dilithiodecane, 1,20-dilithioeicosane, 1,4-dilithiocyclohexane, 1,4 - dilithio-2-butene, 1,8-dilithio-3-decene, 1,4-dilithiobenzene, 1,5-dilithionaphthalene, 1,2-dilithio-1,2-diphenylethane, 9,10-dilithio - 9,10 - dihydroanthracene, 1,2-dilithio-1,8-diphenyloctane, 1,3,5-trilithiopentane, 1,5,15-trilithioeicosane, 1,3,5-trilithiocyclohexane, 1,2,5-trilithionaphthalene, 1,3,5-trilithioanthracene, 1,3,5,8 - tetralithiodecane, 1,5,10,20 - tertalithioeicosane, 1,2,3,5-tetralithiocyclohexane, 1,2,3,5 - tetralithio-4-hexylanthracene, and the like. A full and complete disclosure of polymerizing monomers of this invention with lithium-containing catalysts is found in copending application, Ser. No. 218,853, filed Aug. 23, 1962, of common assignee, now Patent 3,236,821, issued Feb. 22, 1966.

Any catalyst inactivating or shortstop agent can be employed in this invention, suitable agents of which include such materials as hydroquinone, pyrrogallol, catechol, aniline, quinoline, fatty acids such as stearic acid and, preferably, rosin acid.

It should be noted that along with the shortstop other additives can be incorporated in the polymer-monomer solution and ultimately in the polymer. Such additives include antioxidants, extender oil, carbon black or other pigment, or any other ingredients desired. Suitable antioxidants include N-isopropyl-N'-phenyl-p-phenylenediamine, methylene - 2,2'-bis(4-methyl-6-tert-butylphenol), and other similar materials. Other pigments, fillers, and reinforcing agents will be known to those skilled in the art and include titanium dioxide, silica and the like. Extender oils, such as petroleum distillates; vegetable oils, such as linseed and soybean oils; esters, ethers, resins, tars and tar products, and similar materials can also be employed.

It should be noted that the conditions for the polymerization reaction are known in the art and will vary to a large degree depending upon the monomer and catalyst being employed and the amount of polymer desired to be produced. For example, in the polymerization of butadiene monomer the reaction temperature can vary from about 100 to about 270° F. and the pressure can vary from about 15 to about 300 p.s.i.a.

Example

A batch of butadiene is bulk polymerized by charging 3,240 gallons of butadiene and 7.12 pounds of n-butyllithium catalyst to a reactor having a capacity of 4,200 gallons. The polymerization reaction begins at ambient temperatures of about 80° F. and due to the exothermic nature of the reaction the temperature in the reactor rises to 110° F. and a pressure of 68 p.s.i.a. When the temperature exceeds 110° F. butadiene vapor is removed, condensed and cooled to 100° F. at 68 p.s.i.a. and returned and sprayed into the top of the reactor at a rate which maintains the reactor at a temperature of 110° F. and 68 p.s.i.a.

The reaction proceeds for 32 minutes at the end of which time there is present in the reactor 5,930 pounds of polybutadiene, which accounts for a 35 weight percent conversion of butadiene to polybutadiene. During the 32 minutes of reaction 4000 gallons of butadiene is vaporized, condensed, returned to the reactor, revaporized, recondensed, etc. to remove the heat of reaction and maintain the reactor at 110° F. and 68 p.s.i.a. The contents of the reactor are then removed and mixed with 120 pounds of fatty acid shortstop to stop the polymerization reaction. The contents are then steam stripped at 90° F. to remove butadiene from the polybutadiene product of the invention.

Reasonable variation and modifications of this invention can be made, or followed, in view of the foregoing, without departing from the spirit or scope thereof.

We claim:

1. A method of bulk polymerization which comprises maintaining a mixture of a conjugated diene monomer and a catalyst in a reacting zone under polymerization conditions which produce diene polymer in a diene monomer solution and a diene monomer vapor, spirally agitating said mixture in said reacting zone, removing at least a part of the diene monomer vapor from said reacting zone thereby removing excess heat created by the polymerization reaction, condensing said vapor, returning at least a part of said condensed vapor to the top of said reacting zone and spraying said condensed vapor therein to cool said zone and to wash polymer from the upper surfaces of said zone down into said mixture, removing from said reacting zone a solution of diene polymer in diene monomer and recovering therefrom diene polymer.

2. The method of claim 1 wherein the part of the condensed vapor which is not sprayed into the top of the reacting zone is mixed with fresh monomer feed for use in the reacting zone.

3. A method according to claim 1 wherein said conjugated diene monomer has from 4 to 6 carbon atoms per molecule.

4. A method of bulk polymerizing which comprises maintaining a mixture of a conjugated diene monomer and catalyst in a reacting zone under polymerization conditions which produce diene polymer in a diene monomer solution and diene monomer vapors, spirally agitating said mixture in said reacting zone, removing diene monomer vapors from said reacting zone thereby removing excess heat created by the polymerization reaction, condensing said vapors, returning at least part of said condensed vapors to be added to fresh monomer and used as feed to said reacting zone, passing fresh monomer feed to the top of said reacting zone and spraying same therein to cool said zone and to wash polymer from the upper surfaces thereof, removing from said reacting zone a solution of diene polymer and diene monomer and recovering therefrom diene polymer.

5. A method according to claim 4 wherein a part of said condensed vapors is mixed wtih the fresh monomer that is sprayed into the top of the reacting zone.

6. A method according to claim 4 wherein the conjugated diene monomer has from 4 to 6 carbon atoms per molecule.

7. A method of bulk polymerizing which comprises maintaining a mixture of butadiene and an organolithium catalyst in a reacting zone under polymerization conditions which produce polybutadiene in a butadiene solution and butadiene vapors, spirally agitating said mixture in said reacting zone, removing butadiene vapors from said reacting zone, condensing said vapors, returning a part of said condensed vapors to be employed as feed for said reacting zone, returning another part of said condensed vapors to the top of said reacting zone and spraying said condensed vapors therein to cool said zone and to wash polymer from the upper surfaces thereof down into said mixture, removing from said reacting zone a solution of polybutadiene in butadiene and recovering therefrom polybutadiene.

8. The method according to claim 7 wherein said catalyst is n-butyllithium.

References Cited

UNITED STATES PATENTS

| | | | |
|---|---|---|---|
| 2,545,144 | 3/1951 | Green et al. | 260—85.3 |
| 2,931,793 | 4/1960 | Melchore | 260—95 |
| 2,963,470 | 12/1960 | Lanning | 260—94.2 |
| 3,008,938 | 11/1961 | Irwin | 260—94.2 |
| 3,072,621 | 1/1963 | Pampus et al. | 260—94.2 |
| 3,126,365 | 3/1964 | Hooker | 260—95 |
| 3,182,050 | 5/1965 | Irvin | 260—95 |
| 3,193,360 | 7/1965 | Scoggin | 260—95 |
| 3,206,287 | 9/1965 | Crawford | 260—94.2 |

HARRY WONG, Jr., Primary Examiner

U.S. Cl. X.R.

260—23.7, 28.5, 31.2, 33.2, 33.6, 41, 45.9, 45.95